US008309006B2

(12) United States Patent
Kawashiri

(10) Patent No.: US 8,309,006 B2
(45) Date of Patent: Nov. 13, 2012

(54) METHOD OF PRODUCING COMPOSITE PLANT FIBER MATERIAL

(75) Inventor: Hideki Kawashiri, Toyota (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 0 days.

(21) Appl. No.: 12/922,590

(22) PCT Filed: Mar. 24, 2009

(86) PCT No.: PCT/JP2009/055872

§ 371 (c)(1), (2), (4) Date: Sep. 14, 2010

(87) PCT Pub. No.: WO2009/119618

PCT Pub. Date: Oct. 1, 2009

(65) Prior Publication Data

US 2011/0006454 A1 Jan. 13, 2011

(30) Foreign Application Priority Data

Mar. 27, 2008 (JP) ................................ 2008-084956

(51) Int. Cl.
*B29C 47/78* (2006.01)

(52) U.S. Cl. ........... 264/176.1; 264/172.17; 264/331.21; 264/319

(58) Field of Classification Search .................. 264/257, 264/319, 331.11, 331.21, 176.1; 156/180
See application file for complete search history.

(56) References Cited

U.S. PATENT DOCUMENTS

| | | | | |
|---|---|---|---|---|
| 2,895,935 | A * | 7/1959 | Archer et al. | 523/148 |
| 3,047,455 | A * | 7/1962 | Anderson et al. | 162/157.4 |
| 5,213,227 | A * | 5/1993 | Koyama et al. | 220/359.3 |
| 5,654,091 | A * | 8/1997 | Kiriazis et al. | 428/332 |
| 7,166,668 | B2 * | 1/2007 | Symons | 524/539 |
| 7,988,905 | B2 * | 8/2011 | Hashiba et al. | 264/331.21 |

(Continued)

FOREIGN PATENT DOCUMENTS

CA 2407880 4/2004

(Continued)

OTHER PUBLICATIONS

Search report from E.P.O. that issued with respect to patent family member European Patent Application No. 09725933.7, mail date is Apr. 20, 2011.

Japanese Industrial Standard excerpt for JIS K 0070 "Test methods for acid value, saponification value, ester value, iodine value, hydroxyl value and unsaponifiable matter of chemical products ," Translated and Published by Japanese Standards Association, (1992).

(Continued)

*Primary Examiner* — Joseph Del Sole
*Assistant Examiner* — Nahida Sultana
(74) *Attorney, Agent, or Firm* — Greenblum & Bernstein, P.L.C.

(57) ABSTRACT

The object of the present invention is to provide a method for producing a composite plant fiber material capable of achieving both of higher lightweight and better mechanical characteristics. The method of producing a composite plant fiber material having a structure wherein plant fibers (kenaf fibers, etc.) are bonded together via a thermoplastic resin (a polypropylene-based resin, etc.) and containing 30% to 95% by weight of the plant fibers referring the total amount of plant fibers and thermoplastic resin as to 100% by weight, which comprises, in this order, a spinning process for melt-spinning a thermoplastic resin (a polypropylene-based resin) containing an acid-modified thermoplastic resin (maleic anhydride-modified polypropylene, etc.) to give thermoplastic resin fibers; a fiber-mixing process for combining plant fibers (kenaf fibers, etc.) with the thermoplastic resin fibers to give a fiber mixture; and a heating process for melting the thermoplastic resin fibers in the fiber mixture.

9 Claims, 2 Drawing Sheets

U.S. PATENT DOCUMENTS

| | | | | |
|---|---|---|---|---|
| 2004/0026012 | A1 | 2/2004 | Kato et al. | |
| 2005/0200751 | A1* | 9/2005 | Weaver | 348/375 |
| 2007/0219323 | A1* | 9/2007 | Bruning | 525/444 |
| 2007/0292665 | A1* | 12/2007 | Fukunaga et al. | 428/200 |
| 2008/0241536 | A1* | 10/2008 | Luo et al. | 428/393 |
| 2009/0242104 | A1 | 10/2009 | Watanabe | |
| 2009/0291607 | A1* | 11/2009 | Wang et al. | 442/382 |
| 2010/0004358 | A1 | 1/2010 | Hashiba | |
| 2010/0230158 | A1* | 9/2010 | Hase et al. | 174/72 A |

FOREIGN PATENT DOCUMENTS

| | | |
|---|---|---|
| JP | 8-283475 | 10/1996 |
| JP | 08-283475 | 10/1996 |
| JP | 11-070508 | 3/1999 |
| JP | 2002-167514 | 6/2002 |
| JP | 2007-098583 | 4/2007 |
| WO | 2006/065993 | 6/2006 |

OTHER PUBLICATIONS

Wikipedia document: "Lactic acid" http://en.wikipedia.org/wiki/Lactic_acid (retrieved Nov. 15, 2011).

Wikipedia document: "Polylactic acid" http://en.wikipedia.org/wiki/Polylactic_acid (retrieved Nov. 15, 2011).

Chinese Office Action issued with respect to patent family member Chinese Patent Application No. 200980109633.3, dated Jan. 21, 2012, along with an English translation thereof.

Japanese Office Action issued with respect to patent family member Japanese Patent Application No. 2008-084956, mailed Apr. 10, 2012, along with an English translation thereof.

European Office Action issued with respect to patent family member EP Patent Application No. 09 725 933.7, dated May 29, 2012.

* cited by examiner

METHOD OF PRODUCING COMPOSITE PLANT FIBER MATERIAL

TECHNICAL FIELD

The present invention relates to a method for the production of a composite plant fiber material. More particularly, the present invention relates to a method for the production of a composite plant fiber material containing a plant material at high proportion of at least 30% by weight.

BACKGROUND ART

In recent years, a plant such as kenaf which grows fast and has large carbon dioxide absorption has been noticed from the viewpoints of reduction in carbon dioxide emission amount, carbon dioxide immobilization, and the like. And a use of a composite material of the plant with a resin has been expected. A technique disclosed in the following Patent Document 1 is known as a technique utilizing the plant material.

[Patent Document 1]

Japanese Patent Application Publication No. JP-A 2007-98583

DISCLOSURE OF THE INVENTION

Problems that the Invention is to Solve

It is desired that the composite material has compatibility between further weight reduction and further improvement of mechanical characteristics. In other words, weight reduction of a base material consisting of, for example, a composite material can be achieved by decreasing the fiber areal weight; however, when the fiber areal weight is reduced, the mechanical characteristics of the composite material (such as a base material consisting of a composite material) is proportionately decreased in general. It is desired, therefore, that the composite material is required having higher mechanical characteristics even though the fiber areal weight is the same.

The present invention has been accomplished in view of the above-described circumstances, and an object thereof is to provide a method for the production of a composite plant fiber material having higher compatibility between weight reduction and excellent mechanical characteristics.

Means for Solving the Problems

The present invention is as follows.

(1) A method for producing a composite plant fiber material having a structure in which plant fibers are bound with a thermoplastic resin, and containing the plant fiber in an amount of 30% to 95% by weight based on 100% by weight of the total of the plant fiber and the thermoplastic resin, characterized by comprising, sequentially, a spinning process in which a thermoplastic resin containing an acid-modified thermoplastic resin is subjected to melt-spinning to obtain a thermoplastic resin fiber, a fiber-mixing process in which the plant fiber and the thermoplastic fiber are mixed to obtain a fiber mixture, and a heating process in which the thermoplastic resin fiber in the fiber mixture is molten.

(2) The method for producing a composite plant fiber material according to (1) above, wherein the acid-modified thermoplastic resin is an acid-modified polyolefin.

(3) The method for producing a composite plant fiber material according to (1) or (2) above, wherein acid value of the acid-modified thermoplastic resin is 5 or more.

(4) The method for producing a composite plant fiber material according to any one of (1) to (3) above, wherein weight-average molecular weight of the acid-modified thermoplastic resin is in the range from 10,000 to 100,000.

(5) The method for producing a composite plant fiber material according to any one of (1) to (4) above, wherein the thermoplastic resin used in the spinning process contains the acid-modified thermoplastic resin in an amount of 1% to 10% by weight based on 100% by weight of the total of the thermoplastic resin.

(6) The method for producing a composite plant fiber material according to any one of (1) to (5) above, wherein the plant fiber is a kenaf fiber.

Effect of the Invention

According to the method for the production of a composite plant fiber material of the present invention, a composite plant fiber material can be obtained containing large amounts at 30% to 95% by weight and having better mechanical characteristics than the conventional method. In other words, the fiber areal weight required for obtaining the same level of mechanical characteristics may be lowered, and a lighter composite plant fiber material may be obtained than the conventional method.

In the case where the acid-modified thermoplastic resin is an acid-modified polyolefin, an excellent improving effect of mechanical characteristics can be obtained than the case in which other component is used, and a composite plant fiber material can be obtained which is lighter and has better mechanical characteristics.

In the case where the acid value of the acid-modified thermoplastic resin is 15 or more, the resin can provide a highly improving effect of mechanical characteristics using smaller amount of the resin as compared with a material using a component with lower acid value, and a composite plant fiber material can be obtained which is lighter and has better mechanical characteristics in particular.

In the case where the weight-average molecular weight of the acid-modified thermoplastic resin is in the range from 10,000 to 100,000, the excellent spinning efficiency can be obtained while containing the acid-modified thermoplastic resin, and the formation of fibers is particularly easy. Therefore, the above-mentioned effects can be obtained using a fiber of the thermoplastic resin including the acid-modified thermoplastic resin.

In the case where the thermoplastic resin used in the spinning process contains the acid-modified thermoplastic resin in an amount of 1% to 10% by weight based on 100% by weight of the total of the thermoplastic resin, the excellent spinning efficiency can be obtained while containing the acid-modified thermoplastic resin, and the formation of fibers is particularly easy. Therefore, the excellent effects mentioned above can be obtained using a fiber of the thermoplastic resin including the acid-modified thermoplastic resin.

In the case where the plant fiber is a kenaf fiber, since kenaf is a very fast growing annual grass and has excellent absorbitity of carbon dioxide, use of the kenaf can contribute to reducing an amount of carbon dioxide in the air, thus effectively utilizing forest resources and others.

BEST MODE FOR CARRYING OUT THE INVENTION

Figure 1:
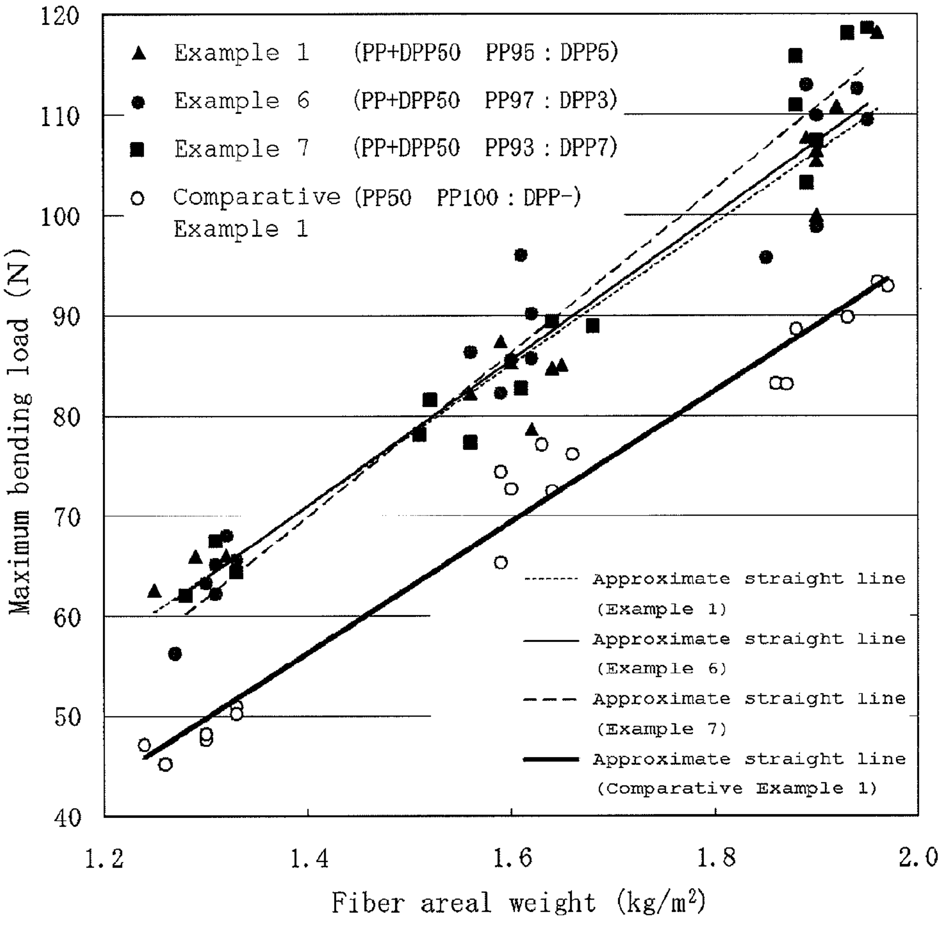
FIG. 1 is a graph showing a correlation between a fiber areal weight and a maximum bending load for a composite plant fiber material consisting of 50% by weight of a plant fiber and 50% by weight of a thermoplastic resin) obtained by a method of the present invention.

Hereinafter, the present invention is described in detail.

[1] Method for Production of Composite Plant Fiber Material

The method for the production of a composite plant fiber material of the present invention is a method for production of a composite plant fiber material having a structure in which plant fibers are bound with a thermoplastic resin, and containing the plant fiber in an amount of 30% to 95% by weight based on 100% by weight of the total of the plant fiber and the thermoplastic resin, and is characterized by comprising a spinning process in which a thermoplastic resin containing an acid-modified thermoplastic resin is subjected to melt-spinning to form a thermoplastic resin fiber, a fiber-mixing process in which the plant fiber and the thermoplastic fiber are mixed to obtain a fiber mixture, and a heating process in which the thermoplastic resin fiber in the fiber mixture is molten, sequentially.

1. Spinning Process

The "spinning process" is a process to obtain a thermoplastic resin fiber by melt-spinning a thermoplastic resin containing an acid-modified thermoplastic resin. Conventional and publicly known melt-spinning method may be used for a melt-spinning step in this process.

The "thermoplastic resin" is a resin that has thermoplasticity and contains an acid-modified thermoplastic resin. (Hereinafter, other thermoplastic resins than the acid-modified thermoplastic resin are referred to as "non-acid-modified thermoplastic resin" in the present invention.)

The "acid-modified thermoplastic resin" is a thermoplastic resin in which an acid-modified group is introduced by acid modification. The acid-modified group introduced into this thermoplastic resin is not particularly limited and is usually an anhydrous carboxylate residue (—CO—O—OC—) and/or a carboxylate residue (—COOH). The acid-modified group may be introduced by any compounds, and the compounds include maleic anhydride, itaconic acid anhydride, succinic anhydride, glutaric acid anhydride, adipic acid anhydride, maleic acid, itaconic acid, fumaric acid, acrylic acid, methacrylic acid, and the like. The compound may be used singly or in combination of two or more types thereof. Among these, maleic anhydride and itaconic acid anhydride are preferable, and maleic anhydride is particularly preferred.

Furthermore, a thermoplastic resin that becomes the skeleton of the acid-modified thermoplastic resin (hereinafter, referred to simply as "skeletal thermoplastic resin") is not particularly limited and various thermoplastic resins may be used. Examples of the skeletal thermoplastic resin include a polyolefin, a polyester resin, polystyrene, an acrylic resin that is obtained using a methacrylate, and/or acrylate, a polyamide resin, a polycarbonate resin, a polyacetal resin, an ABS resin, and the like. Among these, examples of the polyolefin include polypropylene, polyethylene, ethylene propylene random copolymer, and the like. Examples of the polyester resin include an aliphatic polyester resin such as polylactic acid, polycaprolactone and polybutylene succinate, and an aromatic polyester resin such as polyethylene terephthalate, polytrimethylene terephthalate and polybutylene terephthalate, and the like.

Examples of the acid-modified thermoplastic resin include "Umex" (product name, manufactured by Sanyo Chemical Ind., Ltd., "Umex 1001" and "Umex 1010" are preferable), "Admer" (product name, manufactured by Mitsui Chemicals, Inc., "Admer QE800" is preferable), "Modic" (product name, manufactured by Mitsubishi Chemical Corp., "Modic AP P908" is preferable), "Toyotac" (product name, manufactured by Toyo Kasei Kogyo Co., Ltd., "Toyotac H-1100P-P" is preferable), and the like.

The amount of the acid-modified group introduced to the acid-modified thermoplastic resin is not particularly limited. The acid value thereof is usually 5 or more and is usually 80 or less. The acid value thereof is preferably 15 or more. It is preferred that the acid-modified thermoplastic has relatively high acid value. Such acid-modified thermoplastic resins can provide high effect of adding the acid-modified thermoplastic resin while suppressing the amount of the acid-modified thermoplastic resin supplemented. As a result, a thermoplastic resin fiber having fineness suitable for combining of the fibers described below may be smoothly spun. The acid value is preferably in the range from 15 to 70, more preferably from 20 to 60, and particularly from 23 to 30. The acid value is based on JIS K 0070.

The molecular weight of the acid-modified thermoplastic resin is not particularly limited. The weight-average molecular weight is preferably in the range from 10,000 and 200,000, and more preferably from 10,000 to 100,000. It is preferred that the acid-modified thermoplastic resin has a relatively small molecular weight. Such acid-modified thermoplastic resins can provide high effect of adding the acid-modified thermoplastic resin while suppressing the amount of the acid-modified thermoplastic resin supplemented. As a result, a thermoplastic resin fiber having fineness suitable for combining of the fibers described below may be smoothly spun. The lower limit of the weight-average molecular weight is preferably 15,000, more preferably 25,000, and particularly 35,000. On the other hand, the upper limit of the weight-average molecular weight is preferably 200,000, more preferably 150,000, and further preferably 100,000. The weight-average molecular weight is particularly in the range from 35,000 to 60,000. The weight-average molecular weight is based on GPC method.

The melt viscosity of the acid-modified thermoplastic resin is not particularly limited, and it is preferred that the melt viscosity of the acid-modified thermoplastic resin at a temperature of 160° C. is in the range from 4,000 to 30,000 mPa·s. Such acid-modified thermoplastic resin can provide high effect of adding the acid-modified thermoplastic resin while suppressing the amount of the acid-modified thermoplastic resin supplemented. As a result, a thermoplastic resin fiber having fineness suitable for combining of the fibers described below may be smoothly spun. The melt viscosity is preferably in the range from 4,000 to 25,000, more preferably from 5,000 to 20,000, and particularly from 10,000 to 20,000. The melt viscosity is a value measured by B-type viscometer at a temperature of 160° C.

An acid-modified thermoplastic resin satisfying the acid value, weight-average molecular weight and melt viscosity that have preferable ranges is a product "Umex 1001" and/or "Umex 1010" out of "Umex" manufactured by Sanyo Chemical Ind., Ltd.

Meanwhile, a resin other than the acid-modified thermoplastic resin (i.e., non-acid-modified thermoplastic resin) which is contained in the thermoplastic resin is not particularly limited so long as being thermoplasticity. Examples of the non-acid-modified thermoplastic resin (i.e., type of the non-acid-modified thermoplastic resin) include a polyolefin, a polyester resin, polystyrene, an acrylic resin that is obtained using a methacrylate and/or acrylate, a polyamide resin, a polycarbonate resin, a polyacetal resin, an ABS resin, and the like. Among these, examples of the polyolefin include polypropylene, polyethylene, an ethylene propylene copolymer such as ethylene propylene block copolymer and ethylene propylene random copolymer, and the like. Examples of the polyester resin include an aliphatic polyester resin such as polylactic acid, polycaprolactone and polybutylene succinate, and an aromatic polyester resin such as polyethylene terephthalate, polytrimethylene terephthalate and polybutylene terephthalate, and the like. The non-acid-modified thermoplastic resin may be used singly or in combination of two or more types thereof.

The skeletal thermoplastic resin constituting to the acid-modified thermoplastic resin, and the non-acid-modified thermoplastic resin may be the same (homogeneous) or different (heterogeneous). It is preferred that both of them are the same, and are polyolefins. The polyolefin is easy to use and enables to improve the productivity. Additionally, high flexibility and excellent formability can be obtained. Among the polyolefin, a polypropylene, polyethylene, ethylene propylene copolymer, and a mixed resin (alloy) of polypropylene and polyethylene are preferable. As the non-acid-modified thermoplastic resin, a polypropylene and the above-mentioned mixed resin are particularly preferred. As the skeletal thermoplastic resin constituting to the acid-modified thermoplastic resin, a polypropylene is particularly preferred.

Therefore, a polypropylene and the above-mentioned mixed resin are particularly preferred as the non-acid-modified thermoplastic resin, and a maleic anhydride modified polypropylene is particularly preferred as the acid-modified thermoplastic resin.

The content of the acid-modified thermoplastic resin is preferably 15% or less by weight (usually 0.3% or more by weight) based on 100% by weight of the total amount of the thermoplastic resin. When the amount is in this range, the fiber can be smoothly spun, as well as the combination use with the non-acid-modified thermoplastic resin can effectively improve the mechanical characteristics of the molded article (thermoplastic resin molded article) to be obtained. This amount of the acid-modified thermoplastic resin is preferably in the range from 0.5% to 15% by weight, more preferably from 1% to 13% by weight, further preferably from 1% to 10% by weight, furthermore preferably from 1% to 7% by weight, especially 2% to 7% by weight, and particularly from 3% to 7% by weight. Further superior advantages can be obtained in these preferable ranges, respectively.

The fineness and the like of the thermoplastic resin fiber obtained through this melt-spinning process are not particularly limited. The fineness thereof is preferably in the range from 1 to 100 dtex. When the fineness is in the range, the thermoplastic resin fiber can be easily subjected to fiber-mixing with a plant fiber, and the both fibers can be more evenly dispersed and contained in the fiber mixture obtained in the fiber-mixing process. The fineness is more preferably in the range from 1 to 50 dtex, further preferably from 1 to 20 dtex, and particularly from 3 to 10 dtex. Further superior advantages can be obtained in these preferable ranges, respectively.

The average fiber diameter of the thermoplastic resin fiber having fineness of 3 to 10 dtex is approximately in the range from 3.8 to 37.5 μm when a polypropylene is used as the non-acid-modified thermoplastic resin and maleic anhydride modified polypropylene is used as the acid-modified thermoplastic resin.

Methods for measuring the configuration of the thermoplastic resin fiber are the same as the plant fiber described below.

2. Fiber-Mixing Process

The "fiber-mixing process" is a process in which a plant fiber and a thermoplastic fiber are mixed to obtain a fiber mixture.

The "plant fiber" is a fiber derived from a plant. The plant fiber may be a fiber obtained from various kinds of plants such as kenaf, jute hemp, manila hemp, sisal hemp, gampi, Mitsumata, Kozo, banana, pineapple, coconut, corn, sugarcane, bagasse, palm, papyrus, reed grass, esparto, Sabi grass, oat, rice plant, bamboo, various conifer trees (Japanese cedar, Japanese cypress, and others), broad leaf tree, cotton and others. The plant fiber may be used singly or in combination of two or more types thereof. Among these, kenaf is preferred. The kenaf is a very fast growing annual grass and has excellent absorbitity of carbon dioxide so that it can contribute to reducing an amount of carbon dioxide in the air, thus effectively utilizing forest resources and others.

The segment of the plant used as the plant fiber is not particularly limited so long as the segment comprises a segment constituting the plant such as non-woody parts, stalk section, root parts, leaf parts and woody parts. Furthermore, only a specific segment thereof may be used or a different segment with two parts or more may be used.

The kenaf according to the present invention is an easy-growing annual grass having a woody stem and a plant classified into malvaceae in the present invention. The kenaf includes *hibiscus cannabinus* and *hibiscus sabdariffa* of scientific names, and further includes Indian hemp, Cuban kenaf, kenaf, roselle, mesta, bimli hemp, ambary hemp, Bombay hemp and the like of common names.

The jute according to the present invention is a fiber obtained from a jute hemp. The jute hemp includes a hemp including ouma (*Corchorus capsularis* L.), Jew's mallow, East Indian mallow, Mulukhiyya and a plant in Tiliacea.

The average fiber length, average fiber diameter and the like of the plant fiber are not particularly limited. The average fiber length thereof is preferably 10 mm or longer. When the average fiber length of the plant fiber is in this range, a plant fiber and thermoplastic resin fiber are easily fiber-mixed (in particular, formation of entanglement of fibers is easy), and the resultant composite plant fiber material can exert excellent mechanical characteristics. The average fiber length is more preferably in the range from 10 to 150 mm, further preferably from 20 to 100 mm, and particularly from 30 to 80 mm. Further superior advantages can be obtained in these preferable ranges, respectively. The average fiber length is a value for a total of 200 fibers by taking out a single fiber one by one at random and actually measuring a fiber length of single fiber with a ruler without being stretched in the direct method according to JIS L 1015.

On the other hand, the thermoplastic resin fiber is a thermoplastic resin fiber obtained in the spinning process, however, the thermoplastic resin fiber obtained in the process is usually long. Therefore, it is preferred that the thermoplastic resin fiber to be used in the fiber-mixing process is previously adjusted in appropriate length. In the present method, a fiber-length adjusting process for adjusting the length of the thermoplastic resin fiber may be provided between the spinning process and the fiber-mixing process.

The average fiber length, average fiber diameter and the like of the thermoplastic resin fiber to be fiber-mixed with the plant fiber in the fiber-mixing process are not particularly limited. The average fiber length thereof is preferably 10 mm or longer. When the average fiber length of the thermoplastic resin fiber is in this range, a plant fiber and thermoplastic resin fiber are easily fiber-mixed (in particular, formation of entanglement of fibers is easy), and the resultant composite plant fiber material can exert excellent mechanical characteristics. The average fiber length is more preferably in the range from 10 to 150 mm, further preferably from 20 to 100 mm, and particularly from 30 to 70 mm. Further superior advantages can be obtained in these preferable ranges, respectively. The measuring method of the average fiber length may be the same as the method for the plant fiber.

On the other hand, the average fiber diameter of the thermoplastic resin fiber is preferably 1 mm or shorter. When the average fiber diameter of the thermoplastic resin fiber is in this range, the resultant composite plant fiber material can exert excellent mechanical characteristics. The average fiber diameter thereof is more preferably in the range from 0.01 to 1 mm, further preferably from 0.05 to 0.7 mm, and particularly from 0.07 to 0.5 mm. Further superior advantages can be obtained in these preferable ranges, respectively. The fiber length is a value (L) obtained by actually measuring a fiber length for one fiber with a ruler without being stretched in the same manner as the direct method according to JIS L 1015. On the other hand, the fiber diameter is a value (t) obtained by measuring the fiber diameter at the middle of the longitudinal direction of the fiber whose length is measured using a light microscope.

In addition, the thermoplastic resin fiber to be used for the fiber-mixing process may be a fiber consisting of only a thermoplastic resin or may be a fiber coated on the surface thereof. For example, the fiber may be coated with an oil to improve sliding with machineries, a hydrophilic surface treatment agent, or the like.

Regarding the ratio of the plant fiber and the thermoplastic resin fiber for the fiber-mixing, the amount of the plant fiber is in the range from 30% to 95% by weight based on 100% by weight of the total amount of the plant fiber and the thermoplastic resin fiber. When the amount to be used is in the range, prominent formability as well as excellent mechanical characteristics can be obtained in the composite plant fiber material. The amount of the plant fiber is more preferably in the range from 40% to 85% by weight, and particularly from 45% to 75% by weight. Further superior effects can be obtained in these preferable ranges, respectively.

The "fiber-mixing" means to obtain a fiber mixture such as a mat-like article by mixing a plant fiber and thermoplastic resin fiber. The fiber-mixing method is not particularly limited and various methods may be used. In the present method, a dry method or a wet method is usually used. Among these, a dry method is preferable. In the present method, a dry method enabling simpler production is preferred instead of a wet method (such as a dipping method), which requires an advanced drying process because this method uses a plant fiber having a hygroscopicity.

Examples of the dry method include an air-laying method, a carding method, and the like. Among these, an air-laying method is preferable. It is because the method can lead to efficiently combining of the fibers with simpler machine. The air-laying method is a method in which the plant fiber and the thermoplastic resin fiber are fed by airflow onto the surface of a conveyor and others to yield a deposit (fiber mixture) containing the plant fiber and the thermoplastic resin fiber in the sufficient mixing state.

The fiber mixture provided by the air-lay method is usually a mat-like mixture. Such mat-like fiber mixture may be used as only single layer, or may be layered as two or three layers after the fiber-mixing process. In other words, the method may comprise a layering process. According to the process, thickness of the fiber mixture can be controlled, and thus, the fiber areal weight of the obtained composite plant fiber material can also be controlled. Furthermore, the layered fiber-mixture product formed by layering the mat-like fiber mixture may be subjected to entangling so that the mat-like fiber mixtures are integrated each other. In other words, the method may comprise an entangling process. The entangling method is not particularly limited and example thereof includes needle punching, stitch-bonding, water-punching, and the like. Among these, the needle-punching is preferred because of its high efficiency. Needling may be performed from one side or the both sides of the layered product.

The density, fiber areal weight, thickness and other characteristics of the fiber mixture (for example, a mat-like fiber mixture) are not particularly limited. In general, the density is 0.3 g/cm$^3$ or lower, and is usually 0.05 g/cm$^3$ or higher, the fiber areal weight is in the range from 400 to 3,000 g/m$^2$, and preferably from 600 to 2,000 g/m$^2$, and the thickness is 10 mm or more, and is usually 50 mm or less, preferably from 10 to 30 mm, and more preferably from 15 to 40 mm.

The density is a value measured according to JIS K 7112 (a standard for a method for measuring a density and specific gravity of plastics and non-cellular plastics). The fiber areal weight is a weight per 1 m$^2$ at 10% of water content.

3. Heating Process

The "heating process" is a process in which the thermoplastic resin fiber in the fiber mixture is molten. When the heating process is performed, a composite plant fiber material having a structure in which plant fibers are bound with a thermoplastic resin can be obtained.

The heating temperature in the heating process is preferably set to an appropriate temperature (i.e., a temperature in which at least the thermoplastic resin is softened) according to the thermoplastic resin to be used (i.e., the resin comprising the thermoplastic resin fiber). For example, when a polypropylene (including a homopolymer or a block polymer with polyethylene) is used as a non-acid-modified thermoplastic resin and maleic anhydride modified polypropylene is used as an acid-modified thermoplastic resin, the temperature is preferably in the range from 170° C. to 240° C. In the temperature range, the plant fibers can be efficiently bound to each other while burden to the thermoplastic resin is reduced. The heating temperature is more preferably in the range from 180° C. to 230° C., further preferably from 190° C. to 220° C., and particularly from 200° C. to 210° C. When the temperature is in the range, the above-mentioned effects may be obtained.

In the heating process, only heating may be performed, but compression is preferably performed at the same time (heating and compressing process) or after the heating (providing a compressing process after the heating process). The compressing process can bind the plant fibers more strongly to each other by means of the thermoplastic resin as compared with the case where the compressing process is not provided. The pressure for the compression is not particularly limited and is preferably in the range from 1 to 10 MPa, and more preferably from 1 to 5 MPa.

Additionally, when the compressing process is provided, a forming can be performed at the same time. In other words, the material can be formed into a plate shape (a board of the composite plant fiber material) and other shapes (various shapes as product forms) by using a metal mold for the compression. When the material is molded into a plate shape, the product can be used without processing. The plate of the composite plant fiber material may be further processed by final forming process to obtain a final form. In that case, more specifically, the method would comprise a preliminary forming process in which the material is molded into a plate shape at the same time as the heating process or after the heating process, and a final forming process that molds the material into the final shape.

The content of the plant material in the composite plant fiber material obtained by the present method is usually kept to the amount used in the fiber-mixing process. More specifically, the content of the plant fiber is in the range from 30% to 95% by weight, more preferably from 40% to 85% by weight, and particularly from 45% to 75% by weight based on 100% by weight of the total amount of the plant fiber and the thermoplastic resin contained in the composite plant fiber material.

The density of the composite plant fiber material obtained when the compression is performed is not particularly limited. Since the composite plant fiber material is one in which the above-mentioned fiber mixture (for example, a mat-like fiber mixture) is compressed in this case, the density of the compressed fiber mixture becomes higher than the original fiber mixture. The density of the composite plant fiber material is usually higher than 0.3 g/cm$^3$ (usually 1.0 g/cm$^3$ or lower). Measurement of this density is similar with that for the fiber mixture.

The shape, size, thickness and the like of the composite plant fiber material obtained by the present production method are not particularly limited. The application thereof is not particularly limited. The composite plant fiber material is widely used in fields of an automobile, an architecture and others. In particular, these are useful for an interior material, an exterior material, a structural material and others of an automobile, a railcar, a ship, an aircraft and others. Among them, an automobile supplies including an interior material for automobile, an instrument panel for automobile, an exterior material for automobile and others is favorable. Specific examples are a door base material, a package tray, a pillar garnish, a switch base, a quarter panel, a core material for armrest, a door trim for automobile, a seat-structured material, a seat back board, a ceiling material, a console box, a dashboard for automobile, various instrument panels, a deck trim, a bumper, a spoiler, a cowling and others. Other examples including an interior material, an exterior material and a structural material of an architectural structure, furniture and others are suitable. That is, a door surface material, a door structural material, a surface material and a structural material for various furnitures (desk, chain, shelf, chest, and others), and others are included. Additionally a package, a container (tray and others), a member for protection, a member for partition and others may be included.

EXAMPLES

Hereinafter, the present invention is explained in detail using Examples.

Examples 1 to 5

Production of Composite Plant Fiber Materials in which Acid-Modified Thermoplastic Resins are Different from Each Other Polypropylene resin (product name "Novatec SA01" manufactured by Japan Propylene Corp.) as a non-acid-modified thermoplastic resin, and each of following resins (A) to (E) as an acid-modified thermoplastic resin, were mixed so that, assuming that the total amount of the two resins was defined as 100% by weight, the non-acid-modified thermoplastic resin became 95% by weight and the acid-modified thermoplastic resin became 5% by weight. The resultant thermoplastic resin mixture was then subjected to melt-spinning method to form a fiber having a fineness of 6.6 dtex and the fiber was cut to form a thermoplastic resin fiber of 51 mm in length. After that, an air-lay machine was used for controlling the weight ratio of the obtained thermoplastic resin fiber and kenaf fiber having an average length of 70 mm to 50 and 50, and for the preparation of a mat that is a fiber mixture of the thermoplastic resin fiber and the kenaf fiber, and has a thickness of 15 mm.

The obtained mat (fiber mixture) was heated and compressed at the pressure of 24 kgf/cm$^2$ using a pressing machine with the mold temperature set at 235° C. until the internal temperature of the compressed material became 210° C., to produce a board-like composite plant fiber material (preliminary molded product) having a thickness of 2.5 mm. The board-like composite plant fiber material was heated using an oven with the oven-internal temperature set at 235° C. until the internal temperature of the composite material became 210° C. Then, the composite material was taken from the oven and compressed at the pressure of 36 kgf/cm$^2$ for 60 seconds using a pressing machine with the mold temperature set at 40° C., to obtain a board-like composite plant fiber material (actual molded product), which was about 2.3 mm in thickness and about 1.8 kg/m$^2$ in the fiber areal weight.

(Acid-Modified Thermoplastic Resins (A) to (E) Used in Examples 1 to 5)

Example 1: (A) Product name "Umex 1001" (manufactured by Sanyo Chemical Ind., Ltd., acid-modified polypropylene resin having a weight-average molecular weight of 40,000, a melt viscosity of 16,000 at 160° C., and an acid value of 26)

Example 2: (B) Product name "Umex 1010" (manufactured by Sanyo Chemical Ind., Ltd., acid-modified polypropylene resin having a weight-average molecular weight of 30,000, a melt viscosity of 10,000 at 160° C., and an acid value of 52)

Example 3: (C) Product name "Admer QE800" (manufactured by Mitsui Chemicals Inc., acid-modified polyolefin resin)

Example 4: (D) Product name "Modic-AP P908" (manufactured by Mitsubishi Chemical Corp., acid-modified polyolefin resin)

Example 5: (E) Product name "Toyotac Umex 1001" (manufactured by ToyoKasei Co., Ltd., acid-modified polyolefin resin)

Comparative Example 1

Production of a Composite Plant Fiber Material Containing No Acid-Modified Thermoplastic Resin A composite plant fiber material was produced in the same manner as those in [1] above except that a thermoplastic resin fiber was obtained by using only a non-acid-modified thermoplastic resin (product name "Novatec SA01" manufactured by Japan Propylene Corp.) as a thermoplastic resin without an acid-modified thermoplastic resin.

Measurement of Maximum Bending Load of Composite Plant Fiber Materials for Examples 1 to 5 and Comparative Example 1

The maximum bending loads of composite plant fiber materials for Examples 1 to 5 and Comparative Example 1 were measured. For the measurement, a rectangular plate-like test piece, which was cut out from the composite plant fiber material in a size of about 2.3 mm in thickness, 50 mm in width, and 150 mm in length under the condition of at most about 10% of water content, was used. A load was applied at the rate of 50 mm/min from the point of action (curvature radius: 3.2 mm) arranged at the center between the point of support while supporting the test specimen between two supporting points (curvature radius: 3.2 mm) apart 100 mm as the distance between the supporting points (L), measuring maximum bending load according to JIS K 7171.

The maximum bending loads at about 2.3 mm in thickness and about 1.8 kg/m$^2$ in fiber areal weight were as follows:

Example 1: 105 N
Example 2: 100 N
Example 3: 90 N
Example 4: 104 N
Example 5: 102 N
Comparative Example 1: 83 N Based on the above results, substantially high maximum bending loads were obtained in all Examples 1 to 5 using acid-modified thermoplastic resins (A) to (E) as compared with Comparative Example 1. Therefore, it is shown that mechanical strength of the composite plant fiber material could be improved by using the thermoplastic resin fiber containing the acid-modified thermoplastic resin.

Examples 6 to 10 and Comparative Example 2

Comparison of Used Amount of Acid-Modified Thermoplastic Resin and Used Amount of Plant Fibers Polypropylene resin (product name "Novatec SA01" manufactured by Japan Propylene Corp.) as a non-acid-modified thermoplastic resin, and the above-mentioned resin (A) as an acid-modified thermoplastic resin, were mixed so that, assuming that the total amount of the two resins was defined as 100% by weight, the acid-modified thermoplastic resin became the range of 3% to 7% by weight, shown in Tables 1 to 3. The resultant thermoplastic resin mixture was then subjected to melt-spinning method to form a fiber having a fineness of 6.6 dtex and the fiber was cut to form the thermoplastic resin fiber of 51 mm in length. After that, an air-lay machine was used for controlling the weight ratio of the obtained thermoplastic resin fiber and kenaf fiber having an average length of 70 mm to 50 and 50, or 30 and 70 (resin content: 30% by weight), shown in Tables 1 to 3, and for the preparation of a mat that is a fiber mixture of the thermoplastic resin fiber and the kenaf fiber, and has a thickness of 15 mm. Subsequently, the mat was processed in the same manner as that in Example 1 in above [1] to obtain a board-like composite plant fiber material (actual molded product), which was about 2.3 mm in thickness and the fiber areal weight was varied in a range between about 1.3 and 2.0 kg/m$^2$.

Measurement of Mechanical Characteristics of Composite Plant Fiber Material

The density at 10% water content of the each composite plant fiber material for Examples 6 to 10 and Comparative Example 2 was measured according to JIS K 7112 (a standard for a method for measuring a density and specific gravity of plastics and non-cellular plastics). In addition, the maximum bending load, bending strength and flexural modulus were measured in the same manner as those in [3]. These results are shown in Tables 1 to 3, including the results of Examples 1, 6 to 10, and Comparative Examples 1 to 2.

TABLE 1

| | Thickness of board (mm) | Fiber areal weight (kg/m$^2$) | Density (g/cm$^3$) | Maximum bending load (N) | Bending strength (MPa) | Flexural modulus (MPa) |
|---|---|---|---|---|---|---|
| Example 1 | 2.27 | 1.25 | 0.55 | 62.63 | 36.52 | 2843 |
| | 2.29 | 1.29 | 0.56 | 65.98 | 37.73 | 2885 |
| | 2.29 | 1.32 | 0.58 | 66.05 | 37.91 | 2906 |
| | 2.28 | 1.56 | 0.69 | 82.22 | 47.47 | 3412 |
| | 2.27 | 1.59 | 0.70 | 87.44 | 50.96 | 3477 |
| | 2.24 | 1.60 | 0.71 | 85.29 | 50.62 | 3462 |
| | 2.22 | 1.62 | 0.73 | 78.66 | 47.70 | 3252 |
| | 2.26 | 1.64 | 0.72 | 84.73 | 49.67 | 3246 |
| | 2.26 | 1.65 | 0.73 | 85.08 | 50.10 | 3342 |
| | 2.23 | 1.89 | 0.85 | 107.71 | 64.76 | 4149 |
| | 2.21 | 1.90 | 0.85 | 105.39 | 64.82 | 4110 |
| | 2.24 | 1.90 | 0.85 | 106.43 | 63.13 | 3923 |
| | 2.23 | 1.90 | 0.85 | 99.97 | 60.24 | 3731 |
| | 2.25 | 1.92 | 0.86 | 110.78 | 65.61 | 4010 |
| | 2.23 | 1.96 | 0.88 | 118.20 | 70.87 | 4584 |
| Example 6 | 2.28 | 1.27 | 0.56 | 56.30 | 32.59 | 2422 |
| | 2.26 | 1.30 | 0.57 | 63.33 | 37.08 | 2760 |
| | 2.26 | 1.31 | 0.58 | 65.19 | 38.20 | 2757 |
| | 2.23 | 1.31 | 0.59 | 62.23 | 37.56 | 2796 |
| | 2.29 | 1.32 | 0.58 | 68.08 | 38.76 | 2859 |
| | 2.29 | 1.33 | 0.58 | 65.62 | 37.54 | 2895 |
| | 2.26 | 1.56 | 0.69 | 86.35 | 50.68 | 3462 |
| | 2.25 | 1.59 | 0.71 | 82.29 | 48.77 | 3376 |
| | 2.26 | 1.60 | 0.71 | 85.60 | 50.23 | 3544 |
| | 2.26 | 1.61 | 0.71 | 96.08 | 56.14 | 3820 |
| | 2.25 | 1.62 | 0.72 | 90.19 | 53.13 | 3536 |
| | 2.24 | 1.62 | 0.72 | 85.79 | 51.08 | 3459 |
| | 2.25 | 1.85 | 0.82 | 95.76 | 56.44 | 3586 |
| | 2.25 | 1.89 | 0.84 | 112.99 | 66.95 | 4346 |
| | 2.24 | 1.90 | 0.85 | 109.93 | 65.40 | 4456 |
| | 2.25 | 1.90 | 0.84 | 98.91 | 58.39 | 3923 |
| | 2.22 | 1.94 | 0.87 | 112.60 | 68.54 | 4456 |
| | 2.22 | 1.95 | 0.88 | 109.51 | 66.62 | 4249 |
| Example 7 | 2.28 | 1.28 | 0.56 | 62.08 | 35.87 | 2752 |
| | 2.27 | 1.31 | 0.58 | 67.52 | 39.44 | 2902 |
| | 2.25 | 1.33 | 0.59 | 64.38 | 38.24 | 2919 |
| | 2.27 | 1.51 | 0.67 | 78.14 | 45.43 | 3313 |
| | 2.28 | 1.52 | 0.67 | 81.62 | 47.23 | 3349 |
| | 2.24 | 1.56 | 0.70 | 77.33 | 46.36 | 3320 |
| | 2.24 | 1.61 | 0.72 | 82.76 | 49.23 | 3388 |
| | 2.28 | 1.64 | 0.72 | 89.37 | 51.63 | 3460 |
| | 2.27 | 1.68 | 0.74 | 88.96 | 51.88 | 3580 |
| | 2.25 | 1.88 | 0.84 | 110.92 | 65.96 | 4250 |
| | 2.23 | 1.88 | 0.84 | 115.85 | 69.58 | 4408 |
| | 2.25 | 1.89 | 0.84 | 103.21 | 61.08 | 3924 |
| | 2.24 | 1.90 | 0.85 | 107.38 | 63.80 | 4074 |
| | 2.25 | 1.93 | 0.86 | 118.14 | 69.66 | 4515 |
| | 2.26 | 1.95 | 0.87 | 118.63 | 69.80 | 4493 |

In these Examples, 50% by weight of plant fibers and 50% by weight of thermoplastic resin were used.

Example 1: 95% by weight of non-acid-modified PP+5% by weight of acid-modified PP Example 6: 97% by weight of non-acid-modified PP+3% by weight of acid-modified PP Example 7: 93% by weight of non-acid-modified PP+7% by weight of acid-modified PP

TABLE 2

| | Thickness of board (mm) | Fiber areal weight (kg/m$^2$) | Density (g/cm$^3$) | Maximum bending load (N) | Bending strength (MPa) | Flexural modulus (MPa) |
|---|---|---|---|---|---|---|
| Example 8 | 2.28 | 1.15 | 0.50 | 56.09 | 31.66 | 2716 |
| | 2.30 | 1.24 | 0.54 | 58.57 | 33.32 | 2704 |
| | 2.28 | 1.24 | 0.54 | 61.31 | 35.38 | 2922 |

TABLE 2-continued

| | Thickness of board (mm) | Fiber areal weight (kg/m²) | Density (g/cm³) | Maximum bending load (N) | Bending strength (MPa) | Flexural modulus (MPa) |
|---|---|---|---|---|---|---|
| | 2.26 | 1.30 | 0.57 | 61.77 | 36.14 | 3014 |
| | 2.32 | 1.32 | 0.57 | 64.76 | 36.98 | 3434 |
| | 2.26 | 1.38 | 0.60 | 68.50 | 39.39 | 3242 |
| | 2.29 | 1.57 | 0.69 | 85.49 | 49.84 | 3760 |
| | 2.24 | 1.57 | 0.70 | 81.62 | 48.29 | 3520 |
| | 2.27 | 1.68 | 0.74 | 100.44 | 58.58 | 4272 |
| | 2.27 | 1.77 | 0.78 | 104.79 | 60.60 | 4421 |
| | 2.29 | 1.84 | 0.80 | 114.73 | 65.46 | 4621 |
| | 2.27 | 1.88 | 0.83 | 112.24 | 65.07 | 4656 |
| | 2.24 | 1.92 | 0.86 | 135.82 | 80.84 | 5455 |
| | 2.23 | 1.94 | 0.87 | 137.19 | 82.69 | 5427 |
| | 2.24 | 1.98 | 0.88 | 138.84 | 82.29 | 5419 |
| Example 9 | 2.30 | 1.25 | 0.54 | 58.79 | 33.43 | 2732 |
| | 2.28 | 1.29 | 0.57 | 66.84 | 38.54 | 2969 |
| | 2.30 | 1.30 | 0.56 | 64.24 | 36.33 | 2841 |
| | 2.30 | 1.53 | 0.67 | 87.64 | 49.71 | 3760 |
| | 2.29 | 1.55 | 0.67 | 80.22 | 45.75 | 3696 |
| | 2.32 | 1.56 | 0.67 | 82.30 | 46.11 | 3585 |
| | 2.28 | 1.58 | 0.69 | 86.52 | 50.09 | 3771 |
| | 2.30 | 1.64 | 0.71 | 97.88 | 55.46 | 4052 |
| | 2.31 | 1.64 | 0.71 | 89.67 | 50.47 | 3998 |
| | 2.26 | 1.88 | 0.83 | 121.54 | 71.10 | 5102 |
| | 2.28 | 1.88 | 0.83 | 128.54 | 73.81 | 5215 |
| | 2.26 | 1.89 | 0.84 | 129.86 | 76.25 | 5513 |
| | 2.28 | 1.89 | 0.83 | 128.09 | 73.25 | 5231 |
| | 2.29 | 1.94 | 0.85 | 127.29 | 72.52 | 5276 |
| | 2.30 | 1.94 | 0.84 | 140.39 | 78.78 | 5401 |
| Example 10 | 2.27 | 1.24 | 0.55 | 59.69 | 34.83 | 2677 |
| | 2.27 | 1.25 | 0.55 | 62.23 | 36.26 | 2862 |
| | 2.24 | 1.28 | 0.57 | 66.59 | 39.50 | 2978 |
| | 2.25 | 1.28 | 0.57 | 64.53 | 38.16 | 2914 |
| | 2.21 | 1.28 | 0.58 | 64.25 | 39.55 | 3140 |
| | 2.25 | 1.30 | 0.58 | 69.71 | 41.34 | 3065 |
| | 2.33 | 1.51 | 0.65 | 84.62 | 46.88 | 3557 |
| | 2.33 | 1.53 | 0.66 | 87.50 | 48.47 | 3553 |
| | 2.30 | 1.55 | 0.68 | 94.77 | 53.67 | 4009 |
| | 2.32 | 1.60 | 0.69 | 94.20 | 52.63 | 3845 |
| | 2.32 | 1.61 | 0.69 | 101.09 | 56.60 | 4403 |
| | 2.31 | 1.65 | 0.71 | 101.21 | 56.89 | 4559 |
| | 2.33 | 1.87 | 0.80 | 134.92 | 74.42 | 5080 |
| | 2.30 | 1.88 | 0.82 | 130.67 | 73.84 | 5043 |
| | 2.31 | 1.88 | 0.81 | 135.81 | 75.97 | 5253 |
| | 2.34 | 1.90 | 0.81 | 138.21 | 75.38 | 5201 |
| | 2.34 | 1.92 | 0.82 | 135.37 | 74.20 | 5067 |
| | 2.30 | 1.92 | 0.84 | 124.02 | 70.27 | 5133 |

In these Examples, 70% by weight of plant fibers and 30% by weight of thermoplastic resin were used.

Example 8: 97% by weight of non-acid-modified PP+3% by weight of acid-modified PP Example 9: 95% by weight of non-acid-modified PP+5% by weight of acid-modified PP Example 10: 93% by weight of non-acid-modified PP+7% by weight of acid-modified PP

TABLE 3

| | Thickness of board (mm) | Fiber areal weight (kg/m²) | Density (g/cm³) | Maximum bending load (N) | Bending strength (MPa) | Flexural modulus (MPa) |
|---|---|---|---|---|---|---|
| Comparative Example 8 | 2.30 | 1.24 | 0.54 | 47.19 | 26.84 | 2475 |
| | 2.30 | 1.26 | 0.55 | 45.25 | 25.65 | 2345 |
| | 2.23 | 1.30 | 0.58 | 47.75 | 28.93 | 2505 |
| | 2.27 | 1.30 | 0.57 | 48.26 | 28.07 | 2635 |
| | 2.22 | 1.33 | 0.60 | 51.02 | 31.13 | 2637 |
| | 2.19 | 1.33 | 0.61 | 50.26 | 31.49 | 2731 |
| | 2.26 | 1.59 | 0.70 | 74.43 | 43.53 | 3391 |
| | 2.29 | 1.59 | 0.69 | 65.35 | 37.40 | 3181 |
| | 2.29 | 1.60 | 0.70 | 72.77 | 41.44 | 3296 |

TABLE 3-continued

| | Thickness of board (mm) | Fiber areal weight (kg/m²) | Density (g/cm³) | Maximum bending load (N) | Bending strength (MPa) | Flexural modulus (MPa) |
|---|---|---|---|---|---|---|
| | 2.29 | 1.63 | 0.71 | 77.15 | 44.15 | 3572 |
| | 2.28 | 1.64 | 0.72 | 72.51 | 41.80 | 3485 |
| | 2.27 | 1.66 | 0.73 | 76.19 | 44.15 | 3508 |
| | 2.24 | 1.86 | 0.83 | 83.30 | 49.75 | 3663 |
| | 2.21 | 1.87 | 0.85 | 83.22 | 50.81 | 3850 |
| | 2.24 | 1.88 | 0.84 | 88.71 | 53.17 | 3867 |
| | 2.17 | 1.93 | 0.89 | 89.81 | 57.44 | 4272 |
| | 2.16 | 1.96 | 0.91 | 93.41 | 60.18 | 4473 |
| | 2.13 | 1.97 | 0.93 | 92.93 | 61.30 | 4545 |
| Comparative Example 2 | 2.38 | 1.23 | 0.52 | 45.77 | 24.22 | 2382 |
| | 2.41 | 1.26 | 0.53 | 50.67 | 26.21 | 2464 |
| | 2.41 | 1.27 | 0.53 | 44.99 | 23.15 | 2328 |
| | 2.30 | 1.46 | 0.64 | 61.62 | 35.12 | 3246 |
| | 2.31 | 1.50 | 0.65 | 68.23 | 38.33 | 3382 |
| | 2.32 | 1.51 | 0.65 | 68.98 | 38.68 | 3333 |
| | 2.30 | 1.52 | 0.66 | 68.39 | 38.84 | 3270 |
| | 2.28 | 1.53 | 0.67 | 73.81 | 42.52 | 3575 |
| | 2.29 | 1.60 | 0.70 | 76.34 | 43.87 | 3517 |
| | 2.29 | 1.72 | 0.75 | 86.82 | 49.61 | 4068 |
| | 2.25 | 1.79 | 0.79 | 93.32 | 54.96 | 4589 |
| | 2.29 | 1.80 | 0.78 | 92.18 | 52.40 | 4524 |
| | 2.30 | 1.85 | 0.80 | 98.90 | 56.07 | 4297 |
| | 2.32 | 1.86 | 0.80 | 95.38 | 52.76 | 4164 |
| | 2.28 | 1.87 | 0.82 | 103.78 | 59.64 | 4595 |

In Comparative Example 1, 50% by weight of plant fibers and 50% by weight of thermoplastic resin were used.

Comparative Example 1: 100% by weight of non-acid-modified PP+0% by weight of acid-modified PP In Comparative Example 2, 70% by weight of plant fibers and 30% by weight of thermoplastic resin were used.

Figure 2:
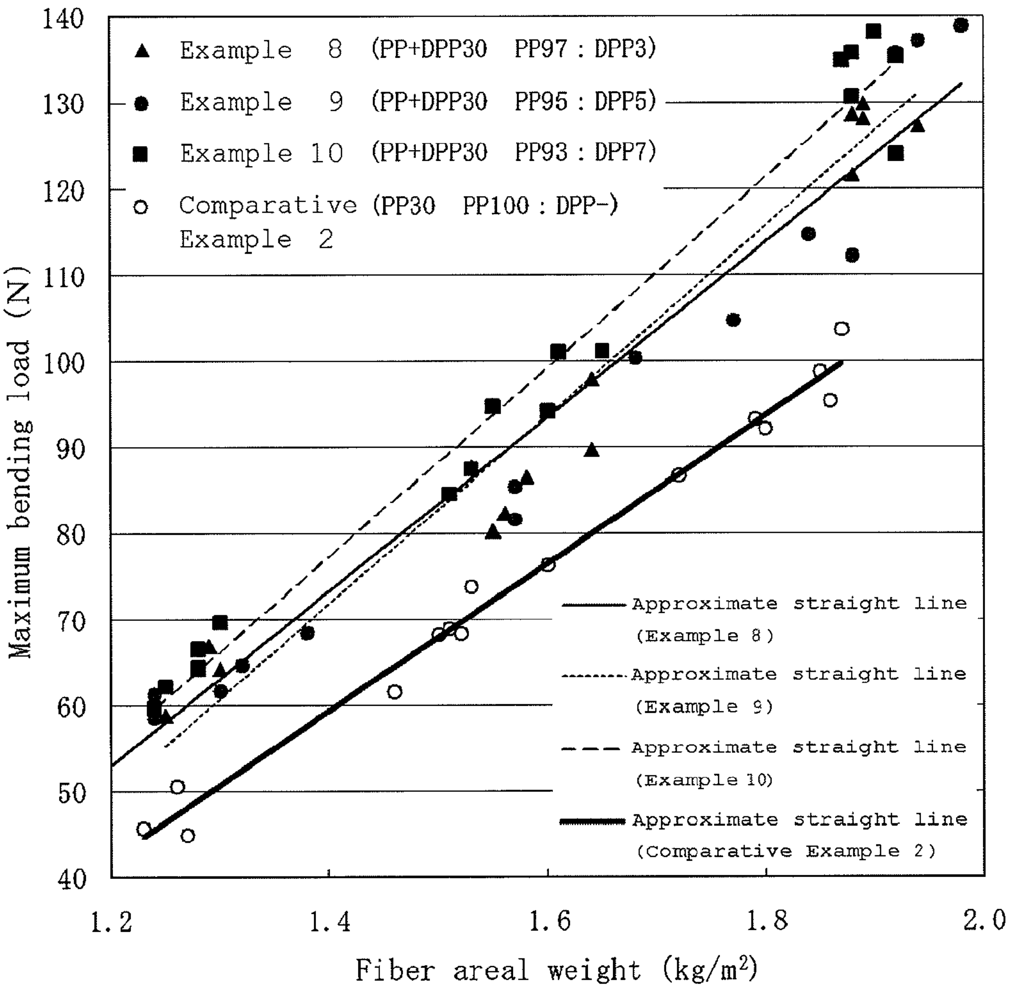
FIG. 2 is a graph showing a correlation between a fiber areal weight and a maximum bending load for a composite plant fiber material consisting of 70% by weight of a plant fiber and 30% by weight of a thermoplastic resin) obtained by a method of the present invention.

Comparative Example 2: 100% by weight of non-acid-modified PP+0% by weight of acid-modified PP Effects of Examples Correlation between the fiber areal weight (X axis) and the maximum bending load (Y axis) was plotted for Tables 1 to 3, as well as an approximate straight line was added to the plot for each Example and Comparative Example as shown in FIG. 1 (Comparative Example 1, and Examples 1, 6 and 7) and FIG. 2 (Comparative Example 2, and Examples 8, 9 and 10). In FIGS. 1 and 2, "PP" represents a polypropylene used in each Example, and "DPP" represents an acid-modified polypropylene used in each Example.

The result shown in FIG. 1 indicates that the maximum bending load is improved in all Examples by using the acid-modified thermoplastic resin as compared with Comparative Example 1. For example, the maximum bending load at 1.8 kg/m$^2$ of fiber areal weight was 82.57 N in the approximate straight line of Comparative Example 1, however, corresponding maximum bending load was obtained at 1.56 kg/m$^2$ of fiber areal weight in Examples 1 and 6, and at 1.55 kg/m$^2$ of fiber areal weight in Example 7. Therefore, it is shown that about 14% of weight reduction is possible in these Examples as compared with Comparative Example 1. In the same way, the maximum bending load at 1.6 kg/m$^2$ of fiber areal weight was 69.46 N in the approximate straight line of Comparative Example 1, however, corresponding maximum bending load was obtained at 1.38 kg/m$^2$ of fiber areal weight in Examples 1 and 6, and at 1.39 kg/m$^2$ of fiber areal weight in Example 7. Therefore, it is shown that about 14% of weight reduction is possible in these Examples as compared with Comparative Example 1.

Approximate straight lines of Examples 1 and 6 are arranged in relatively parallel to that of Comparative Example 1. On the other hand, there is a tendency that a difference of the maximum bending load between the approximate straight lines of Example 7 and Comparative Example 1 increases when the fiber areal weight becomes higher. Therefore, it is shown that a significant effect of improving mechanical characteristics when the acid-modified resin is used.

On the other hand, the result shown in FIG. 2 indicates that the maximum bending loads were improved in all Examples in which the acid-modified thermoplastic resin was used, as compared with Comparative Example 2. For example, the maximum bending load at 1.8 $kg/m^2$ of fiber areal weight was 93.77 N in the approximate straight line of Comparative Example 2, however, corresponding maximum bending load was obtained at 1.60 $kg/m^2$ of fiber areal weight in Examples 8 and 9, and at 1.55 $kg/m^2$ of fiber areal weight in Example 10. Therefore, it is shown that about 11% to 14% of weight reduction is possible in these Examples as compared with Comparative Example 2. In the same way, the maximum bending load at 1.6 $kg/m^2$ of fiber areal weight was 76.59 N in the approximate straight line of Comparative Example 2, however, corresponding maximum bending load was obtained at 1.43 $kg/m^2$ of fiber areal weight in Example 8, at 1.44 $kg/m^2$ of fiber areal weight in Example 9, and at 1.39 $kg/m^2$ of fiber areal weight in Example 10. Therefore, it is shown that about 10% to 13% of weight reduction is possible in these Examples as compared with Comparative Example 2.

There is a tendency that a difference of the maximum bending load between the approximate straight lines of each Examples 8 to 10 and Comparative Example 2 increases when the fiber areal weight becomes higher. Therefore, it is shown that a significant effect of improving mechanical characteristics when the acid-modified resin is used.

INDUSTRIAL APPLICABILITY

The production method of a composite plant fiber material in the present invention is widely used in fields of an automobile, an architecture and others. In particular, these are useful for an interior material, an exterior material, a structural material and others of an automobile, a railcar, a ship, an aircraft and others. Among them, an automobile supplies including an interior material for automobile, an instrument panel for automobile, an exterior material for automobile and others is favorable. Specific examples are a door base material, a package tray, a pillar garnish, a switch base, a quarter panel, a core material for armrest, a door trim for automobile, a seat-structured material, a seat back board, a ceiling material, a console box, a dashboard for automobile, various instrument panels, a deck trim, a bumper, a spoiler, a cowling and others. Other examples including an interior material, an exterior material and a structural material of an architectural structure, furniture and others are suitable. That is, a door surface material, a door structural material, a surface material and a structural material for various furnitures (desk, chain, shelf, chest, and others), and others are included. Additionally a package, a container (tray and others), a member for protection, a member for partition and others may be included.

The invention claimed is:

1. A method for producing a composite plant fiber material having a structure in which plant fibers are bound with a thermoplastic resin, and containing said plant fiber in an amount of 30% to 95% by weight based on 100% by weight of the total of said plant fiber and said thermoplastic resin, comprising, sequentially, a spinning process in which a thermoplastic resin containing an acid-modified thermoplastic resin is subjected to melt-spinning to obtain a thermoplastic resin fiber, a fiber-mixing process in which said plant fiber and said thermoplastic fiber are mixed to obtain a fiber mixture, and a heating process in which said thermoplastic resin fiber in said fiber mixture is molten.

2. The method for producing a composite plant fiber material according to claim 1, wherein said acid-modified thermoplastic resin is an acid-modified polyolefin.

3. The method for producing a composite plant fiber material according to claim 2, wherein the Japanese Industrial Standard K 0070 acid value of said acid-modified thermoplastic resin is 5 or more mg KOH/g.

4. The method for producing a composite plant fiber material according to claim 3, wherein weight-average molecular weight of said acid-modified thermoplastic resin is in the range from 10,000 to 100,000.

5. The method for producing a composite plant fiber material according to claim 2, wherein said thermoplastic resin used in said spinning process contains said acid-modified thermoplastic resin in an amount of 1% to 10% by weight based on 100% by weight of the total of said thermoplastic resin.

6. The method for producing a composite plant fiber material according to claim 1, wherein said plant fiber is a kenaf fiber.

7. The method for producing a composite plant fiber material according to claim 2, wherein said plant fiber is a kenaf fiber.

8. The method for producing a composite plant fiber material according to claim 2, wherein weight-average molecular weight of said acid-modified thermoplastic resin is in the range from 10,000 to 100,000.

9. The method for producing a composite plant fiber material according to claim 1, wherein said thermoplastic resin used in said spinning process contains said acid-modified thermoplastic resin in an amount of 1% to 10% by weight based on 100% by weight of the total of said thermoplastic resin.

* * * * *

UNITED STATES PATENT AND TRADEMARK OFFICE

CERTIFICATE OF CORRECTION

PATENT NO. : 8,309,006 B2
APPLICATION NO. : 12/922590
DATED : November 13, 2012
INVENTOR(S) : H. Kawashiri It is certified that error appears in the above-identified patent and that said Letters Patent is hereby corrected as shown below:

In the Claims

At column 16, line 13 (claim 1, line 8) of the printed patent, please insert -- comprising an anhydrous carboxylate residue -- after resin.

At column 16, line 27 (claim 3, line 4) of the printed patent, "5 or more" should be -- 5 - 80 --.

Signed and Sealed this
Second Day of July, 2013

Teresa Stanek Rea
*Acting Director of the United States Patent and Trademark Office*